(12) United States Patent
Nagl et al.

(10) Patent No.: US 8,597,375 B2
(45) Date of Patent: Dec. 3, 2013

(54) THREE PHASE SULFUR SEPARATION METHOD WITH INTERFACE CONTROL

(71) Applicant: Merichem Company, Houston, TX (US)

(72) Inventors: Gary J. Nagl, Deer Park, IL (US); Anthony A. Barnette, McHenry, IL (US); Myron Reicher, Arlington Heights, IL (US)

(73) Assignee: Merichem Company, Houston, TX (US)

(*) Notice: Subject to any disclaimer, the term of this patent is extended or adjusted under 35 U.S.C. 154(b) by 0 days.

(21) Appl. No.: 13/733,241

(22) Filed: Jan. 3, 2013

(65) Prior Publication Data

US 2013/0186839 A1      Jul. 25, 2013

Related U.S. Application Data

(62) Division of application No. 12/637,301, filed on Dec. 14, 2009, now Pat. No. 8,367,009.

(51) Int. Cl.
*C01B 17/033* (2006.01)

(52) U.S. Cl.
USPC ........................................ 23/308 S; 23/294 S

(58) Field of Classification Search
USPC ............... 23/308 S, 294 S, 308 R; 422/245.1, 422/250.1, 253, 252
See application file for complete search history.

(56) References Cited

U.S. PATENT DOCUMENTS

| | | | |
|---|---|---|---|
| 2,826,306 A | 3/1958 | Burns | |
| 4,206,181 A | 6/1980 | Ullrich | |
| 4,304,570 A | 12/1981 | Kleeberg et al. | |
| 4,730,369 A | 3/1988 | Nagl et al. | |
| 4,876,079 A | 10/1989 | Kliem et al. | |
| 5,154,835 A | 10/1992 | DeMichael | |
| 5,651,896 A | 7/1997 | Nagl | |

OTHER PUBLICATIONS

International Search Report for Int. App. No. PCT/US20101060079, mailed Mar. 21, 2011.

*Primary Examiner* — Edward Johnson
(74) *Attorney, Agent, or Firm* — McDonnell Boehnen Hulbert & Berghoff LLP

(57) ABSTRACT

A liquid separator system having a gas phase zone, an aqueous phase zone and a denser liquid zone is used to separate mixtures of fluids. The separator can be used for separating molten sulfur from liquid redox solution or reslurry water. The system includes a vessel with a top part and a bottom part. The vessel has a larger diameter at the top part than at the bottom part. The system also includes an inlet for introducing a redox solution or reslurry water and molten sulfur, which is denser than redox solution or reslurry water, into the vessel. An outlet near the bottom part of the vessel allows a flow of the molten sulfur from the vessel. An interface control structure senses an interface level between the redox solution or reslurry water and the molten sulfur, and the interface control structure controls the flow of molten sulfur from the outlet. The interface control structure is adjusted to optimally alter the vertical height of the interface level within the vessel so that the residence time of the molten sulfur in the vessel does not decrease as the sulfur production throughput decreases, and so that the interface area of the molten sulfur and the redox solution is reduced as the sulfur throughput decreases. A pressure controller monitors the pressure in the vessel and adds or removes gas from a gas phase zone in the vessel to maintain a predetermined pressure regardless of the vertical height of the interface.

3 Claims, 3 Drawing Sheets

THREE PHASE SULFUR SEPARATION METHOD WITH INTERFACE CONTROL

CROSS-REFERENCE TO RELATED APPLICATIONS

The present application is a divisional of U.S. patent application Ser. No. 12/637,301 filed Dec. 14, 2009. The entire disclosure contents of this application are herewith incorporated by reference into the present application.

FIELD OF THE INVENTION

The present invention relates to separator system where three fluid phases are used to separate a more dense liquid from a less dense liquid by maintaining constant pressure in the separator by adding or removing gas from a gas phase zone. More specifically, our system can be used as an improved sulfur separation system for recovering sulfur from a gas stream and a liquid stream that includes both molten sulfur and redox solution.

BACKGROUND

By-products of many desulfurization redox processes include solid elemental sulfur suspended in a liquid redox solution. In some liquid redox processes, it is desirable and necessary to use a sulfur melter to melt the solid elemental sulfur to produce a high quality, marketable sulfur product. However, metallic ions in the redox solution, such as iron and vanadium, react with hydrosulfide, thiosulfate and bicarbonate ions, collectively called "reactive solutes," at elevated temperatures, forming metallic polysulfides. These metallic polysulfides are undesirable in the context of producing high quality elemental sulfur. The formation of a high quantity of metallic polysulfides may render the sulfur unusable, and also cause fouling in the melter, requiring subsequent cleaning of the melter tubes.

The rate at which metallic ions react with sulfur is a function of the quantity of metallic ions in the redox solution, the melter temperature, the amount of time the sulfur is in contact with the redox solution at elevated temperatures, and the surface area of the interface between the molten sulfur and the redox solution. If more metallic ions are present in the solution, more polysulfides will be formed. As the melter temperature increases, the reaction activity between sulfur and metallic ions increases, forming more metallic polysulfides. As the contact time between the molten sulfur and the redox solution at high temperatures increases, more metallic polysulfides will be formed. The interface between the molten sulfur and the redox solution provides constant contact of the molten sulfur and the metallic ions. Thus, a smaller interface surface area between the molten sulfur and the redox solution will limit the formation of metallic polysulfides.

A filter/wash/reslurry system may be employed to reduce the metallic ions and reactive solutes entering the sulfur melter. Also, sulfur melters may be operated at the lowest possible temperature above the melting point of the sulfur. Although limiting the metallic ions and reactive solutes entering the melter via filtration and operating the melter at lower temperatures are effective techniques in improving sulfur quality, residence time and interface surface area also play significant roles in the formation of metallic polysulfides and consequently sulfur quality. Even when the melter temperature is maintained at the lowest possible level in conjunction with a filter/wash/reslurry system, sulfur quality will deteriorate when long residence times and large interface areas are employed.

With conventional sulfur separation designs, residence time is one of the least controllable variables affecting sulfur quality. Sulfur separators are generally designed to provide a specific residence time for phase separation corresponding to the maximum sulfur throughput of the unit, and determined largely by the aqueous volumetric flow. As residence time increases beyond the time expected during maximum sulfur production, sulfur separation improves because the sulfur droplets have more time to separate from the redox solution. In addition, the interface level between the redox solution and the molten sulfur is more sharply defined, and thus interface level control is improved. However, as residence increases, the formation of polysulfides increases. Thus, an optimum residence time is generated based on a compromise between these considerations.

Prior known designs control the flow of molten sulfur by maintaining the interface level at a certain vertical level. Examples of these designs are described in U.S. Pat. Nos. 4,730,369 and 5,651,896. These known separators are liquid full vessels and do not have a gas phase. The principle is that the operating pressure of the vessel is maintained at a pressure set point to keep the aqueous phase from vaporizing when operating at or above the melting point of sulfur. However, in actual operation, when the molten sulfur control value (interface level control) or the aqueous solution control value (pressure control) opens, the pressure within the vessel drops and a portion of the aqueous phase vaporizes. This vaporization causes severe operating problems such a molten sulfur carry-over out of the top of the vessel and the resultant plugging due to freezing of the molten sulfur in downstream equipment and piping. Our invention now solves this and other problems by including a third fluid phase, namely a gas phase, in the main separator vessel with a separate control system to maintain the pressure of the vessel regardless of the level of the aqueous phase or the molten sulfur phase. These and other advantages will become evident from the following more detailed description of the invention.

SUMMARY

As illustrated by a preferred embodiment of the invention, the present invention, in a principal aspect, relates to a liquid separator system. The system includes a vessel with a top part and a bottom part. The vessel has a larger diameter at the top part than at the bottom part, and the cross section of the vessel downwardly decreases from the top part to the bottom part of the vessel. The system includes a first inlet for introducing a mixture of two liquids, the second more dense than the first, into the vessel. An inlet/outlet located in the top part allows introduction of a pressurized gas stream into the vessel or the removal of excess pressurized gas in order to maintain a constant operating pressure of the vessel. Maintenance of a constant pressure prevents the aqueous phase from boiling and causing carryover of the denser liquid. An outlet near the bottom part of the vessel allows a flow of the denser liquid from the vessel. An interface control structure senses an interface level between the two liquids and controls the flow of the denser liquid from the outlet. By adjusting the set point of the interface control structure, the vertical height of the interface level within the vessel can be optimally altered so that the residence time of the denser liquid in the vessel does not increase as the throughput of the denser liquid decreases. This also reduces the interface area of the two liquids as the throughput decreases. The interface structure includes a control valve that opens and closes (may be open/close or modulating depending on system requirements) to control the removal of the denser liquid phase. The aqueous level in the vessel is maintained by a level control between the upper most level of the aqueous phase and the gaseous interface. An aqueous phase controller is in communication with a control valve that modulates to maintain the level of the aqueous phase. The internal pressure of the vessel is maintained at a constant predetermined or desired level regardless of the positions of the denser liquid and aqueous phase control valves. This is achieved by adjusting the pressure of the gas phase in the vessel by modulating the inflow and outflow of gas from the vessel. The particular gas used as the gas phase is not critical to our invention and may be selected from the group consisting of air, $N_2$, fuel gas, or any inert, economical, non-condensable gas, which is at the desired pressure. In a particular embodiment of the invention, the system is used to separate molten sulfur from liquid redox solution and/or reslurry water.

It is thus an object of the present invention to improve the quality of a denser liquid separated from an aqueous liquid using a three phase separator system. It also an object of our invention to improve the quality of sulfur recovered from a redox application. A further object of the invention is to provide a system where the residence time of molten sulfur in a sulfur separator can be varied according to sulfur throughput. Another object of the invention is an improved sulfur separation device that permits more precise interface level control while achieving the advantages of varying the interface surface area and residence time. Another object of the invention is a system that allows the interface area between the liquid redox solution and/or the reslurry water and the molten sulfur to be varied. A further object of the invention is an improved sulfur separation system that is adaptable for use with existing technology. Still a further object is to prevent sulfur carryover by maintaining a constant pressure in the vessel. Yet another object of the invention is a more cost effective method of recovering high quality elemental sulfur.

The features of the present invention may be better understood by considering the following detailed description of the invention. In the course of the description, reference is made to the attached drawings.

DETAILED DESCRIPTION

Figure 1:
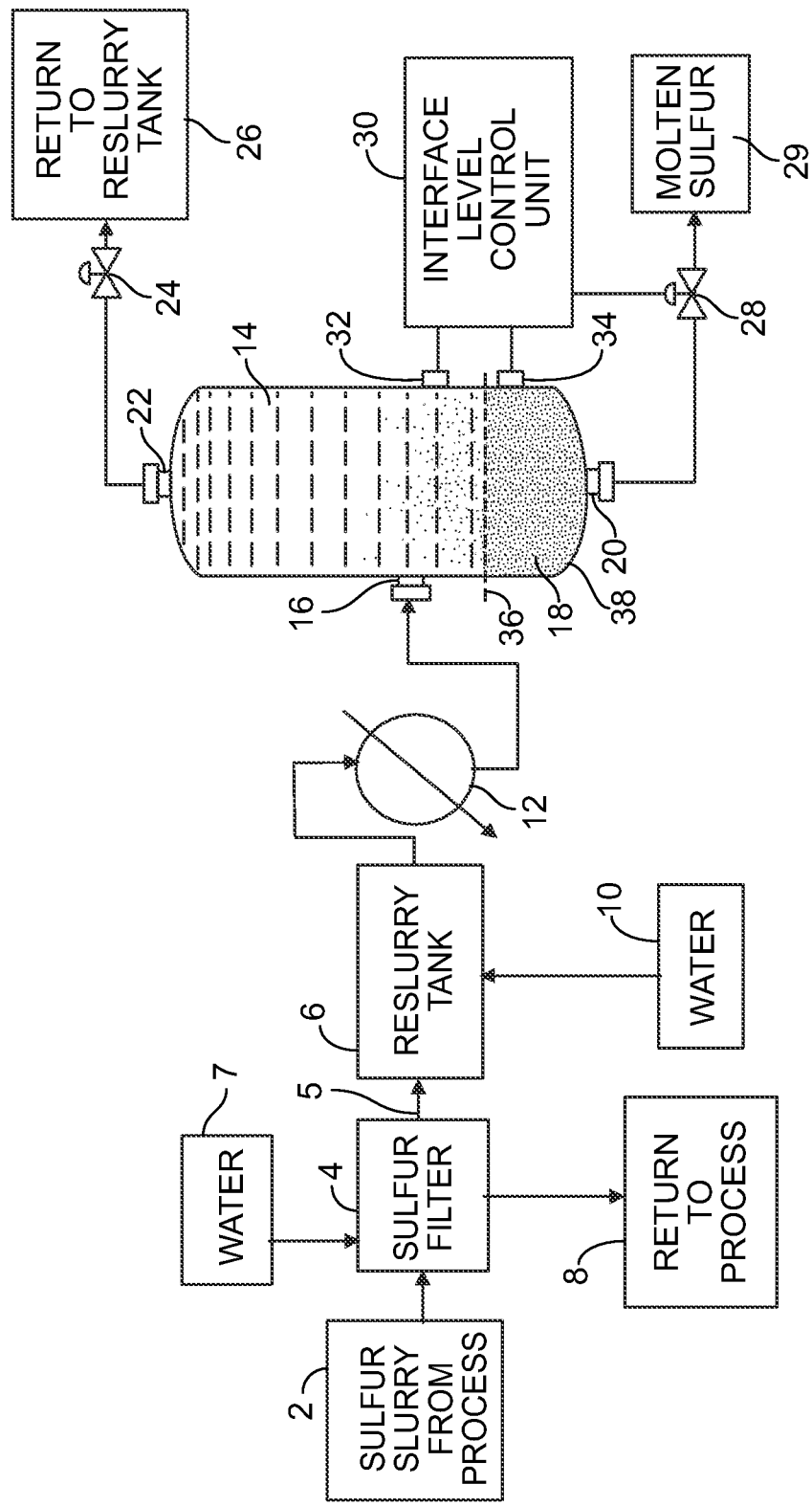
FIG. 1 is a schematic block diagram of a prior art method of removing elemental sulfur from slurry.
Figure 2:
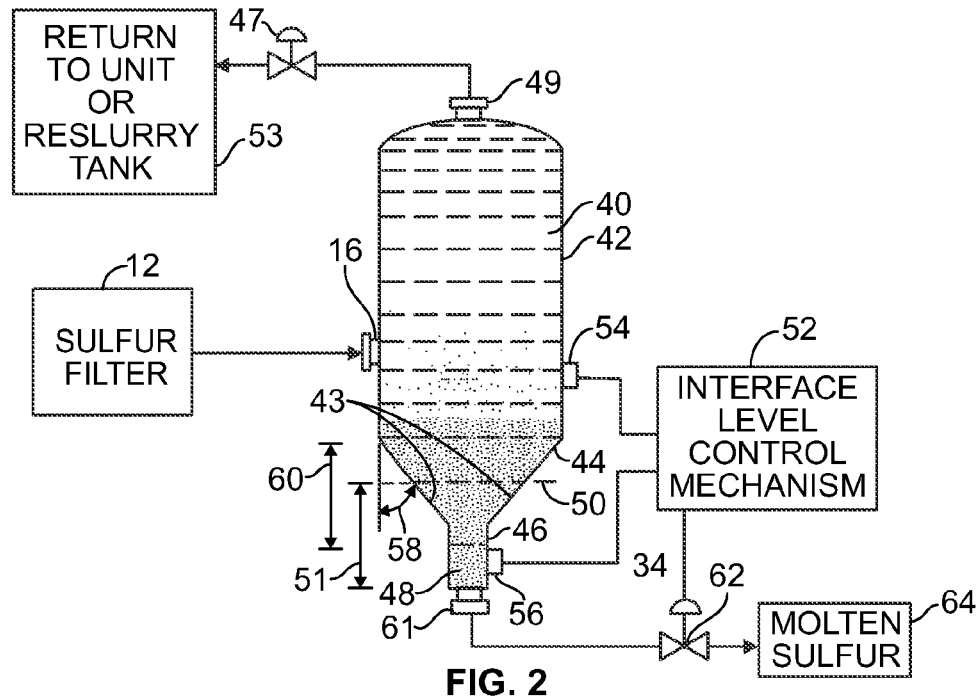
FIG. 2 is a schematic block diagram of another prior art method of removing elemental sulfur from slurry.

To establish the context of the invention, reference is made to FIGS. 1 and 2, which depict known processes of producing molten sulfur from a liquid redox process. Neither of these known systems use a three fluid phase separator. Sulfur slurry from a liquid redox application, as shown at 2, which includes elemental solid sulfur suspended in redox solution, is passed through a sulfur filter 4. The slurry can be either a relatively concentrated slurry (approximately 15 wt %) as would be produced in a concentrating device, such as a settling vessel, or a relatively dilute slurry (0.1 wt %) as would be encountered if no concentrating device were employed. In the sulfur filtering operation, the majority of the redox solution is removed and returned to the process as filtrate, as shown at 8. The solid sulfur that remains after the filtrate is removed is referred to as sulfur cake or filter cake, and is shown at 5. In some applications, clean water, as shown at 7, is sprayed over the filter cake to achieve a better separation between the sulfur cake and the redox solution. This operation is called "washing." The solid sulfur 5, along with some redox solution and wash water, enters a reslurry tank 6. As shown at 10, water is added to the reslurry tank 6, to create a sulfur slurry that is passed through a sulfur melter or heat exchanger 12. The filter/wash/reslurry system shown in 4, 6, and 10 helps to remove metallic ions, such as iron and vanadium and reactive solutes, from the slurry, which in turn will reduce the amount of undesirable polysulfides formed in the melting process. Some systems do not employ the filter/wash/reslurry process, thus slurry from the process 2 goes directly to the sulfur melter 12.

In known processes the sulfur slurry is heated, by indirect heat exchange with either steam or a hot heat transfer fluid, in sulfur melter 12 to a temperature above the melting point of sulfur. Thus, the sulfur melts, and a hot solution exiting the sulfur melter 12 contains aqueous redox solution and reslurry water and molten sulfur. The molten sulfur is both immiscible in and denser than the redox solution and the reslurry water. The hot solution, which is also referred to as melter effluent, then enters a vessel or sulfur separator 14 or 40 via an inlet. Inside the sulfur separator, the denser, molten sulfur droplets separate by gravity from the less dense redox solution and reslurry water, and the denser molten sulfur droplets fall to the bottom of the sulfur separator. The denser molten sulfur and the redox solution or reslurry water form an interface, as depicted by the line 36.

The molten sulfur flows from the bottom of the sulfur separator and is removed by outlet valve 28 or 62. Unlike our invention, pressure in the sulfur separator of known systems is controlled by a pressure control valve 24 or 47, which controls the flow of the aqueous phase, i.e. reslurry water and redox solution, from the separator. This is done in an attempt to prevent the water from boiling, which in turn cause carryover of the molten sulfur into process lines where it freezing and causes plugging. The reslurry water that flows from the sulfur separator is either returned to the reslurry tank, or directed to disposal. In an application in which the filter/wash/reslurry system is not employed, the liquid leaving the aqueous phase zone of the sulfur separator will be redox solution where it will be returned to the unit. The flow of molten sulfur out of the sulfur separator is controlled by an automatic control valve, which is typically a steam jacketed, plug valve (for on/off control or a steam jacketed v-ball valve for modulating control). An interface level control unit that indirectly measures the level of molten sulfur within the separator controls the control valve. The prior design as illustrated in FIG. 1 used a single vessel that was large enough for phase separation at design sulfur load with the design aqueous phase flow. Typically, the aqueous flow dominates the size required. Since interface level control uses the same diameter as the separation step, the sulfur residence time in these vessels was quite large. Further, at deep turndown, the separation volume was more than required, but there was no ability to change the volume. Moreover, the volume of the sulfur below the interface level is constant regardless of the throughput. Therefore the residence time of the sulfur exposed to operating temperature is very large at turndown conditions.

In the second prior process, as shown in FIG. 2, the narrow boot 46 became the level control portion; the reducing cone portion 44 allowed for varying of the residence time in the separation zone but required the operator to first change the interface level setpoint so that the interface would be in the cone area. At extremely low throughput, the interface could actually be located in the boot, thus minimizing the sulfur residence time.

Figure 3:
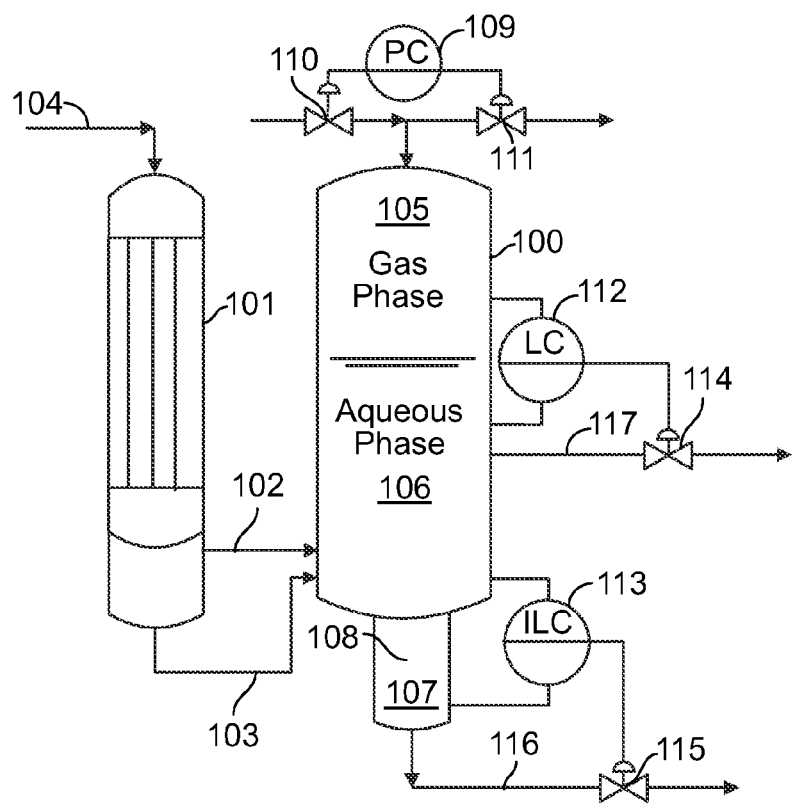
FIG. 3 is a depiction of a preferred embodiment of the invention.

Referring now to FIG. 3, illustrating one of many preferred embodiments of our invention, the system includes a vessel or sulfur separator 100 that receives a sulfur melter effluent containing molten sulfur redox solution from sulfur melter 101, preferably as two separate streams 102 and 103. Since the sulfur droplets are approximately twice as dense as the aqueous droplets, an initial separation between the two liquid phases will occur in the outlet head of the heat exchanger—stream 102, which will be mostly aqueous solution and stream 103, which will be mostly molten sulfur. By removing these two streams separately from the heat exchanger a more efficient separation will occur in the separator 100. Sulfur separator 100 includes three zones—a gas phase zone 105, an aqueous phase zone 106 and a denser liquid phase zone 107. Both the gas phase and aqueous phase zones are cylindrical in shape and of a greater diameter than that of the denser liquid phase zone.

Figure 4:
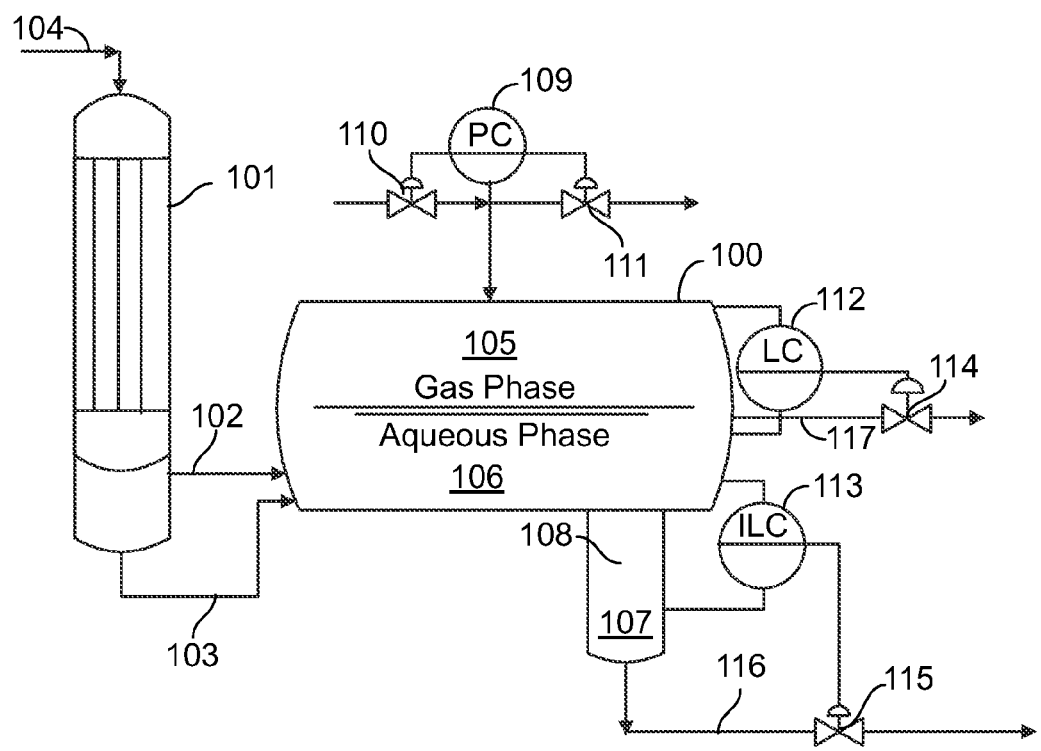
FIG. 4 is a depiction of an alternate preferred embodiment of the invention.

After the melter effluent enters the sulfur separator, the denser sulfur droplets settle by gravity to the bottom of the sulfur separator, while the less dense aqueous solution rises to a level near the middle of the sulfur separator. Although the inlet containing the melter effluent can be located anywhere in vessel 100, it is preferred to split the effluent with one stream inlet optimally located where the sulfur separator has a relatively large diameter. This reduces the upper velocity of the redox solution as the effluent is introduced in the sulfur separator, and permits the sulfur droplets to settle and agglomerate into larger droplets and eventually into a continuous molten sulfur phase at the bottom of the sulfur separator. The second effluent inlet is preferably located near the middle of the denser liquid phase zone of the separator vessel. The molten sulfur and liquid redox solution form an interface, shown by the dashed line 108. The bottom of vessel 100 can have a boot as shown in FIGS. 3 & 4, or a more tapered conical bottom terminating in a boot as depicted in FIG. 2.

Pressure in the sulfur separator 100 is controlled by a pressure controller 109 that operates control valves 110 and 111. The pressure controller senses the pressure in separator 100 and will open or close valves 110 or 111 as needed to maintain a preset or desired pressure, i.e. the set point pressure. If the pressure controller senses a pressure below the set point pressure it will open valve 110 to introduce a pressurized gas, preferably a gaseous fluid selected from the group consisting of air, nitrogen, fuel gas, or any other non-condensable gas, which is at the desired pressure. If the sensed pressure is above the set point pressure, then the pressure controller will close valve 110 and open valve 111 to remove or vent gas from the gas phase zone of the separator. This removed gas can be used in other processes or burned in a flare.

The system of our invention also uses two liquid level controllers 112 and 113 that control valves 114 and 115, respectively. Controller 112 senses the level between the gas phase zone 105 and the aqueous zone 106 and controller 113 senses the level between the aqueous phase zone 106 and the denser liquid phase zone 107. Valve 114 controls the flow of aqueous solution from the sulfur separator and prevents the aqueous solution from boiling within the separator. Aqueous solution that flows from the sulfur separator via outlet 117 is returned to the unit or a reslurry tank, or disposal. The interface level control mechanisms used in our system can be any type of reliable control mechanism. The preferred mechanisms measure the interface in the sulfur separator by measuring the pressure at pressure sensors located above and below the interface levels of the gas phase and the aqueous phase, and below and above the interface level of the aqueous and denser liquid phases. The pressure differential between the 2 sensors is indicative of the interface level.

The system also includes an outlet 116 through which molten sulfur flows from the sulfur separator through control valve 115. The flow rate of molten sulfur from the sulfur separator defines a sulfur throughput. The amount of time between the introduction of the molten sulfur into the sulfur separator at inlet 102 and 103 and the removal of the molten sulfur via the outlet 116 defines a residence time of the molten sulfur in the system. The flow rate of molten sulfur is controlled by an outlet valve 115, which is controlled by the interface level control mechanism 113. The interface level control mechanism 113 and the outlet valve 115 together form one outlet control mechanism or structure. The interface level control mechanism 112 and control valve 114 together forms a second control mechanism. When the unit is operating at the design sulfur throughput, it is preferred to maintain the interface 108 near the top of the smaller diameter of separator 100. As the sulfur throughput decreases, the interface level 108 is lowered by adjusting the set point(s) of the interface level control mechanism 113.

The invention may also include variations of the sulfur separator shape, for example the sulfur separator illustrated FIG. 4 is horizontal in shape. Alternatively, the slope of the internal walls of the separator may define a tapered transition between the denser liquid phase zone and the aqueous phase zone. The system may also be used with liquids other than redox solution, such as reslurry water. Likewise, the system may also be used with liquids other than molten sulfur.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The means, materials, and steps for carrying out various disclosed functions may take a variety of alternative forms without departing from the invention. Thus, the expressions "means to . . . " and "means for . . . ", or any method step language as may be found in the specification above or the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation within the terms of the following claims.

The invention claimed is:

1. A method of separating molten sulfur from a fluid, comprising the steps, in combination, of:
 (a) introducing a liquid mixture comprising the fluid and the molten sulfur into a vessel, the molten sulfur sinking in the vessel and forming an interface with the fluid at a vertical height;
 (b) monitoring gas pressure within the vessel with a controller and controlling an inlet and outlet valve to add or remove gas from a gas phase zone in the vessel to maintain a predetermined pressure within the vessel independent of the vertical height of the interface;

(c) removing molten sulfur from the vessel; and (d) altering the vertical height of the interface in response to the rate of removal of the molten sulfur from the vessel.

2. A method as claimed in claim 1 wherein the fluid is liquid redox solution or reslurry water.

3. A method as claimed in claim 1 wherein a residence time of the molten sulfur in the vessel remains relatively constant in response to changes in the rate of removal of the molten sulfur from the vessel.

* * * * *